United States Patent [19]
Ward et al.

[11] Patent Number: 5,707,585
[45] Date of Patent: Jan. 13, 1998

[54] LIQUID METAL PUMP AND APPARATUS FOR USE IN CLEANING AND RECYCLING SOLDER

[75] Inventors: Thomas Ward, Leigh; David James Settle, Chorley; Anthony James Brown, Warrington, all of United Kingdom

[73] Assignee: AEA Technology plc, Didcot, United Kingdom

[21] Appl. No.: 597,025

[22] Filed: Feb. 5, 1996

[51] Int. Cl.$^6$ .................................................. C21C 5/42
[52] U.S. Cl. ........................... 266/237; 222/593; 222/592
[58] Field of Search ............................ 266/200, 237; 222/593, 592, 590

[56] References Cited

U.S. PATENT DOCUMENTS 5,377,961  1/1995  Smith et al. ............................. 266/237

*Primary Examiner*—Scott Kastler
*Attorney, Agent, or Firm*—William R. Hinds

[57] ABSTRACT

A liquid metal electromagnetic pump 17 operates by passing an electric current through the liquid metal in a direction transverse to an applied magnetic field and the longitudinal axis of the liquid metal flow pipe. The direction of the pump is reversible by reversing the electric current. It is used to transfer batches of contaminated solder from a reservoir 12 in a hot air solder leveller 11 to a treatment tank (TA or TB). Contamination of the solder is removed by a cleaning process and the liquid solder returned to the reservoir 12 after heating to the required process temperature.

9 Claims, 3 Drawing Sheets

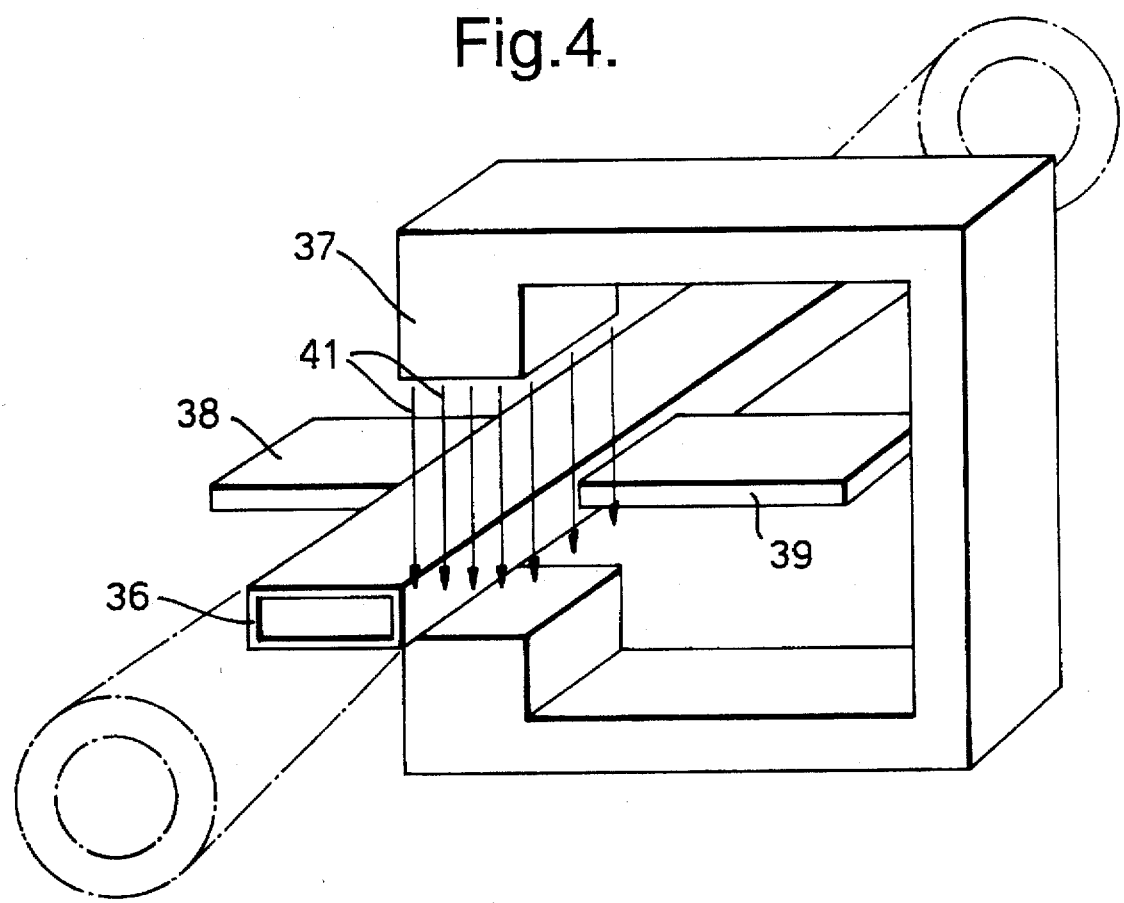

LIQUID METAL PUMP AND APPARATUS FOR USE IN CLEANING AND RECYCLING SOLDER

The invention relates to a liquid metal pump and more particularly to an apparatus incorporating a liquid metal pump for cleaning and recycling solder.

A key part of the manufacturing process of electrical devices is the deposition of solder as, for example, on to the connecting pads and mounting holes on a printed circuit board. A machine known as a hot air solder leveller (HASL) is commonly used for this purpose.

Such a machine provides for coating of exposed copper on the printed circuit board with a thin layer of tin-lead solder (typically in the ratio 63% tin to 37% solder). During the process the solder becomes contaminated with copper and has to be replaced. The solder reservoir contains about 250 g of molten solder at an operating temperature of 260° C. When the copper contamination rises above acceptable process levels, the contaminated solder is removed, allowed to solidify and sent away to a company which specialises in cleaning the solder to remove the contamination. The solder level is maintained in the reservoir by melting into it ingots of clean solder.

The invention serves to improve upon this procedure in a number of respects, by providing for reclamation of contaminated solder in a plant which can be directly coupled to an HASL.

A key requirement for this is a suitable liquid metal pump which can be used for pumping liquid solder between a cleaning plant and the HASL reservoir.

The invention provides apparatus for use in cleaning and recycling solder from a reservoir containing solder used in an automatic soldering plant for making electrical connections in the manufacture of electrical devices. The apparatus comprises at least one treatment tank, a first flow pipe coupling the treatment tank to a pump for liquid metal, a second flow pipe for coupling the pump to the reservoir, heating means and cooling means for the treatment tank, the pump comprising a magnet, a pipe positioned between pole pieces of the magnet so that the magnetic field extends transversely through the interior of the pipe, and means for coupling a supply of electric current to be carried in the direction transverse to both the longitudinal axis of the pipe and the magnetic field through liquid metal contained, during use of the pump, in the pipe and exposed to the transverse magnetic field, whereby the resultant electromagnetic force pumps the liquid metal through the pipe. The cooling means may comprise an air fan and ducts for guiding the air flow from the fan to stream over a substantial portion of the exposed surface areas of the walls of the treatment tank, and the treatment tank may be surrounded by thermally insulating material with a narrow gap between at least one wall of the treatment tank and the insulating material, the ducting guiding the air flow from the fan into the gap. The treatment tank may be rectangular, and the heating means may comprise electrical heaters on another wall of the treatment tank which another wall may comprise the bottom of the tank. Conveniently the magnet is a permanent magnet, but an electromagnet can be used.

The interior surface of the pipe positioned between pole pieces of the magnet may comprise, in at least the region where the supply of electric current is coupled to the liquid metal, a material which is wetted by the liquid metal, such as nickel.

BRIEF DESCRIPTION OF THE DRAWINGS

A specific construction of apparatus embodying the invention will now be described by way of example and with reference to the drawings filed herewith in which:

FIG. 4 is a diagrammatic perspective illustration of a liquid metal pump.

FIG. 1 shows the essential components of apparatus for repeatedly cleaning and recycling batches of solder from an HASL 11 whilst the latter remains operative on line.

Figure 1:
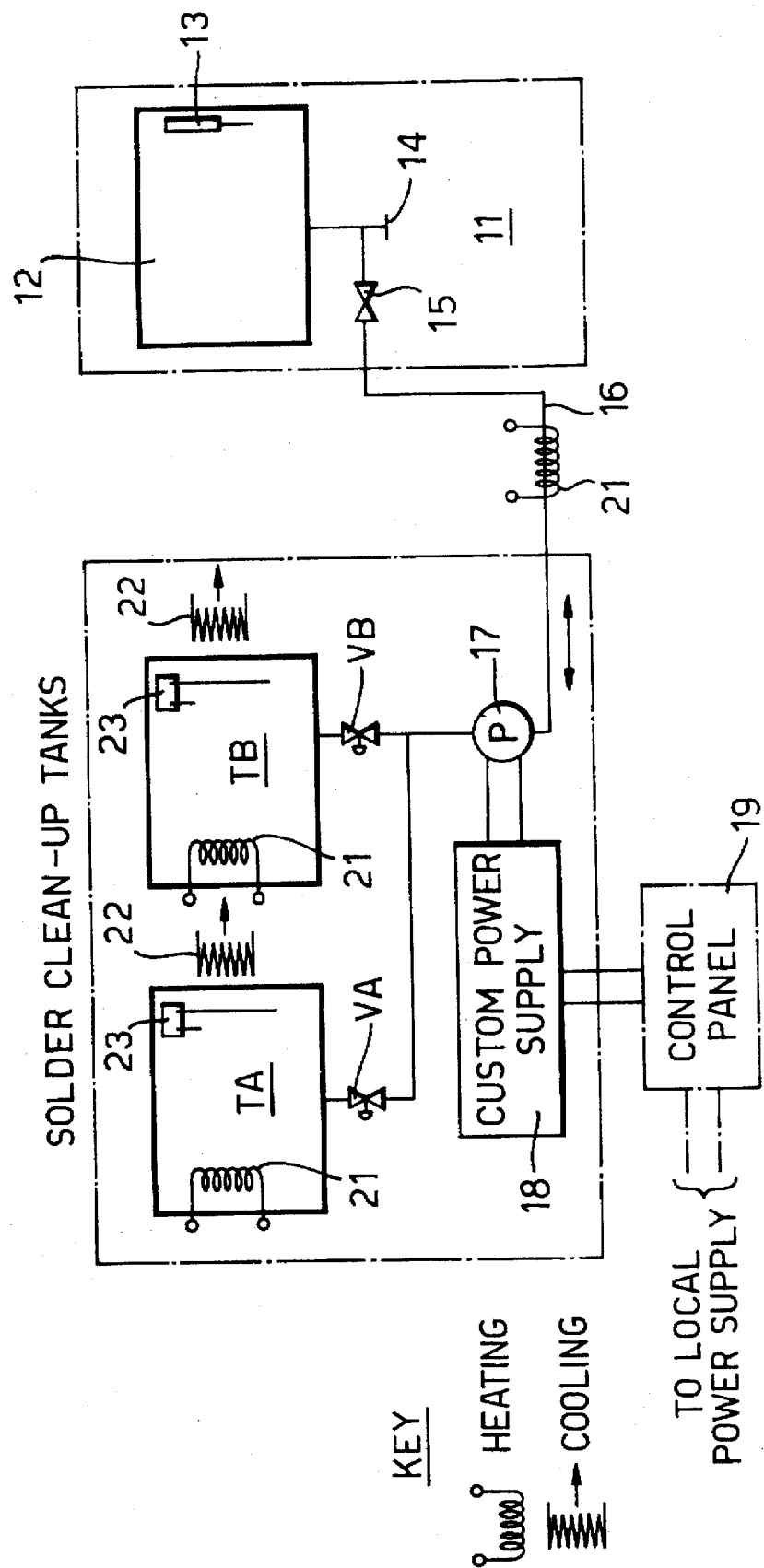
FIG. 1 is a simplified flow diagram of the apparatus.

The HASL 11 has a solder reservoir 12 provided with an electrical heater (not shown) and conventional control components which may include high and low level detectors, the high level detector being illustrated at 13.

An outlet pipe from the bottom of the solder reservoir 12 is connected via a manually controlled valve (not shown) to a drain at 14 and also via a valve 15 and pipe 16 to a reversible liquid metal pump 17. Electrical power supply and control for the pump are illustrated diagrammatically at 18 and 19.

Two treatment tanks for cleaning up contaminated solder are provided at TA and TB connected respectively by valves VA and VB to the liquid metal pump 17. All three of the valves, VA, VB and 15 are electro-pneumatic valves controllable from the control panel 19.

Heaters are represented diagrammatically at 21 for the treatment tanks TA and TB and also on the pipeline 16. In fact all pipes, and valves through which molten solder is to pass are made of stainless steel and are trace heated and lagged.

Cooling for the treatment tanks TA and TB is indicated on FIG. 1 at 22. This is described in more detail in relation to FIGS. 2 and 3.

The treatment tanks TA and TB are also provided with detectors for indicating the high and low limits of solder liquid level. These are referenced 23.

Figure 2:
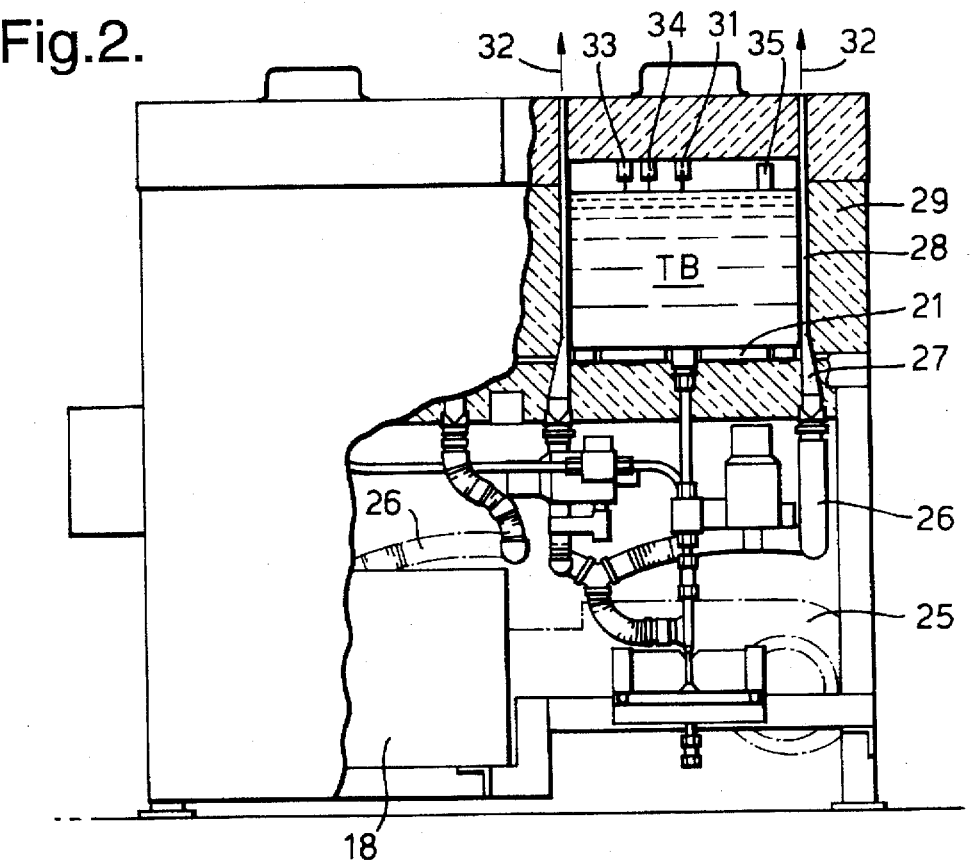
FIG. 2 is a diagrammatic front view partly in section.
Figure 3:
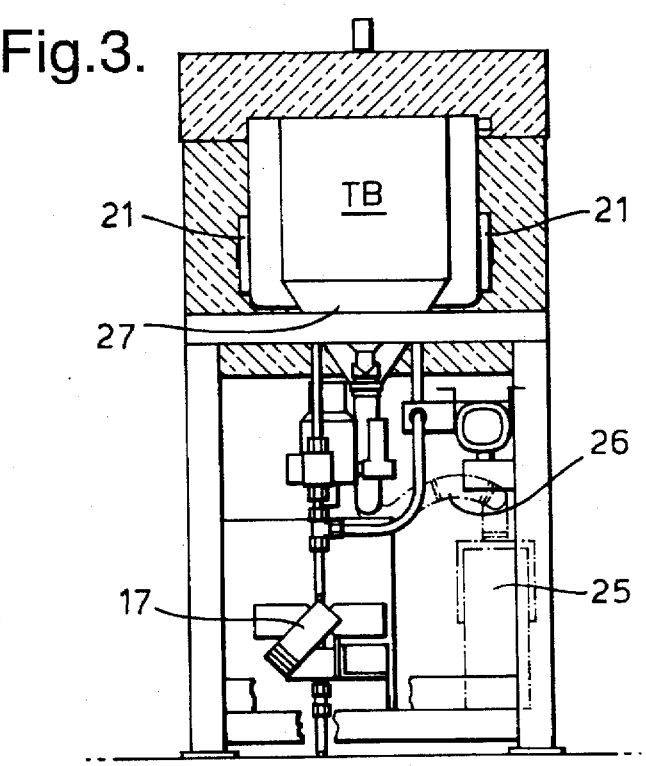
FIG. 3 is a partly sectioned side view.

Referring to FIGS. 2 and 3 the treatment tanks TA and TB are provided with heaters 21 on two sides (see FIG. 3) and at the bottom.

For cooling, each treatment tank is provided with a tooling fan 25 with cooling air ducts 26 leading via a Y junction to fan shaped nozzles. These fan shaped nozzles, of which there are two, lead cooling air into a uniform stream flowing over opposite sides of the treatment tank through a narrow air gap 28 between the treatment tank and surrounding insulation 29. The air flow exhausting from the gaps 28 around the sides of a removable lid 31 discharges as indicated by arrows 32.

Each treatment tank is provided with an upper liquid level sensor 33, a lower liquid level sensor 34 and a temperature sensor 35. FIG. 2 shows a further, centrally positioned, temperature sensor, but this has been found to be redundant as explained below.

FIG. 4 shows diagrammatically the essential components of the liquid metal pump 17. Pipe 36 extending between the jaws of a permanent magnet 37 is flattened so as to make the most effective use of the interaction of the liquid metal with the magnetic field. To create this interaction, an electric current is passed through the liquid metal where it passes between the jaws of the magnet 37. The current is fed into the liquid metal via electrodes 38 and 39 which, it will be seen, cause the current to flow in a direction transverse to both the longitudinal axis of the pipe 36 and the magnetic field indicated by arrows 41. The interaction of the magnetic field with the current passing through the liquid metal between electrodes 38 and 39 generates a force driving the liquid metal through the pipe 36. The direction of flow is reversed by reversing the direction of the current which is supplied from a high current low voltage power supply.

An important feature of the pump is that the surface of the electrodes 38, 39 or that part of the pipe wall where the current passes into the liquid metal should be wetted by the liquid metal. For solder, we have found a surface coating of nickel is suitable to provide a wetted surface across which there is effective transfer of electric current. This form of pump is particularly suitable as it involves no moving parts (apart from the pumped liquid metal itself), requires no seals and the direction of flow is very easily reversed.

The operating sequence is as follows:

When the contamination with copper of the solder in the reservoir 12 has risen to an unacceptable level, valves 15 and VB are opened and the pump operated to transfer solder from the reservoir 12 into treatment tank TB.

Valve VB is closed and a flow of cooling air from fan 25 initiated to start the cooling of solder now in tank TB. The pump 17 is reversed and valve VA opened, tank TA containing at this stage solder which has been previously cleaned and is ready for return to top up the reservoir 12 in HASL 11.

The flow of cooling air is controlled to bring the temperature down to 180° C. to 189° C. in the treatment tank TB. We have found it important to operate this control from a temperature sensor 35 close to the cooled side walls. If a centrally located temperature sensor is used, there is a tendency for temperature gradients to be set up and the solder can even solidify in the region near the side walls which are cooled.

At the low temperature, copper contamination in the solder precipitates and floats on the surface from which it is removed manually with a scoop.

The cooling fan 25 is switched off and heaters 21 turned on to reheat the solder to the required process temperature (260° C.).

At this stage, a further volume of contaminated solder from the reservoir 12 can be transferred into the treatment tank TA and clean solder from treatment tank TB transferred back to replace it in reservoir 12.

The cooling, skimming and reheating procedure is then applied to the solder now in treatment tank TA and the whole procedure can then be repeated as required.

The control system makes use of known components and techniques to provide a semi-automatic interactive control as required for operator safety and protection of the equipment.

Interlocking relays are incorporated in the control system to ensure so far as possible that the above described sequence is followed. Cooling and heating to the set temperature levels is controlled by the temperature sensors and three term control regulating the respective heat input/output at the required set point. The volume of solder transferred for each treatment stage is automatically controlled by the high and low level sensors 23 in the treatment tanks.

An over temperature unit is provided for monitoring the pipes, pump duct and treatment tanks TA and TB and will trip the system if an over temperature fault is detected. A transfer system stop control is provided on both the control panel and on the supporting framework of the clean up system.

The invention is not restricted to the details of the foregoing example.

We claim:

1. Apparatus for use in cleaning and recycling solder from a reservoir containing solder used in an automatic soldering plant for making electrical connections in the manufacture of electrical devices, which apparatus comprises at least one treatment tank, a first flow pipe coupling the treatment tank to a pump for liquid metal, a second flow pipe for coupling the pump to the reservoir, heating means and cooling means for the treatment tank, the pump comprising a magnet, a pipe positioned between pole pieces of the magnet so that the magnetic field extends transversely through the interior of the pipe, and means for coupling a supply of electric current to be carried in the direction transverse to both the longitudinal axis of the pipe and the said magnetic field through liquid metal contained, during use of the pump, in the pipe and exposed to the said transverse magnetic field, whereby the resultant electromagnetic force pumps the liquid metal through the pipe.

2. Apparatus as claimed in claim 1, wherein the cooling means comprises an air fan and ducts for guiding the air flow from the fan to stream over a substantial portion of the exposed surface area of the walls of the treatment tank.

3. Apparatus as claimed in claim 2, wherein the treatment tank is surrounded by thermally insulating material with a narrow gap between at least one wall of the treatment tank and the insulating material, the said ducting guiding the air flow from the fan into the said gap.

4. Apparatus as claimed in claim 3, wherein the treatment tank is rectangular, and the heating means comprises electrical heaters on another wall of the treatment tank.

5. Apparatus as claimed in claim 4, wherein the said another wall comprises the bottom of the tank.

6. Apparatus as claimed in claim 1, wherein the magnet is a permanent magnet.

7. Apparatus as claimed in claim 1, wherein the magnet is an electromagnet.

8. Apparatus as claimed in claim 1, wherein the interior surface of the said pipe positioned between pole pieces of the magnet comprises, in at least the region where the supply of electric current is coupled to the liquid metal, a material which is wetted by the liquid metal.

9. Apparatus as claimed in claim 8, wherein the said material is nickel.

* * * * *